United States Patent
Paritosh

(12) 
(10) Patent No.: US 8,909,713 B2
(45) Date of Patent: Dec. 9, 2014

(54) METHOD AND SYSTEM FOR FILTERING TEXT MESSAGES

(75) Inventor: Praveen K. Paritosh, Chicago, IL (US)

(73) Assignee: Vibes Media LLC, Chicago, IL (US)

(*) Notice: Subject to any disclaimer, the term of this patent is extended or adjusted under 35 U.S.C. 154(b) by 341 days.

(21) Appl. No.: 11/709,332

(22) Filed: Feb. 21, 2007

(65) Prior Publication Data

US 2008/0201411 A1 Aug. 21, 2008

(51) Int. Cl.
- *G06F 15/16* (2006.01)
- *H04L 12/58* (2006.01)
- *H04L 29/06* (2006.01)

(52) U.S. Cl.
CPC ............ *H04L 12/585* (2013.01); *H04L 51/12* (2013.01); *H04L 63/0245* (2013.01); *H04L 12/5895* (2013.01)
USPC ......................................................... 709/206

(58) Field of Classification Search
CPC ............ H04L 63/0245; H04L 12/5895; H04L 12/585
USPC ......................................................... 709/206
See application file for complete search history.

(56) References Cited

U.S. PATENT DOCUMENTS

| | | | |
|---|---|---|---|
| 5,699,517 A * | 12/1997 | Yamasaki | 709/203 |
| 6,144,934 A | 11/2000 | Stockwell et al. | |
| 6,185,551 B1 | 2/2001 | Birrell et al. | |
| 6,424,997 B1 * | 7/2002 | Buskirk et al. | 709/206 |
| 6,807,566 B1 * | 10/2004 | Bates et al. | 709/206 |
| 7,406,501 B2 * | 7/2008 | Szeto et al. | 709/206 |
| 2005/0136901 A1 * | 6/2005 | Jung et al. | 455/415 |
| 2006/0031318 A1 * | 2/2006 | Gellens | 709/206 |
| 2006/0041848 A1 * | 2/2006 | Lira | 715/805 |
| 2007/0027992 A1 * | 2/2007 | Judge et al. | 709/227 |
| 2007/0143411 A1 * | 6/2007 | Costea et al. | 709/206 |
| 2007/0208816 A1 * | 9/2007 | Baldwin et al. | 709/206 |
| 2007/0214220 A1 * | 9/2007 | Alsop et al. | 709/206 |
| 2008/0091765 A1 * | 4/2008 | Gammage et al. | 709/202 |
| 2008/0200153 A1 * | 8/2008 | Fitzpatrick et al. | 455/414.1 |

* cited by examiner

*Primary Examiner* — Arvin Eskandarnia
(74) *Attorney, Agent, or Firm* — Bishop Diehl & Lee, Ltd.

(57) ABSTRACT

A system and method is provided for filtering text messages to determine which of the messages, if any, contains undesirable or unsuitable content. The method includes receiving a message containing at least one text character. The text is manipulated to generate a plurality of tokens that are compared with data contained in a plurality of databases. As a result, a plurality of probabilities are generated related to the suitability of the message. The probabilities are weighted to generate an overall probability related to the suitability of the message. The overall probability is then compared to a threshold value to rate the suitability of the message. Further, the rating associated with the message is displayed on a computer display screen or the like.

54 Claims, 4 Drawing Sheets

METHOD AND SYSTEM FOR FILTERING TEXT MESSAGES

RELATED APPLICATIONS

None.

FEDERALLY SPONSORED RESEARCH OR DEVELOPMENT

Not applicable.

FIELD OF THE INVENTION

The present invention relates to a method and system for filtering electronic communications, and in particular to a method and system for identifying short message service communications or other text messages containing undesirable or unsuitable content.

BACKGROUND OF THE INVENTION

There are many providers of systems for content filtering of text messages such as email. Typically, in these types of filtering systems, emails are organized according to a specified criterion. Most often, the filtering process is performed automatically. However, human intervention is sometimes used in lieu of, or in addition to, the automated filtering.

In theory, given enough time, the best and most accurate way to judge the suitability of the content of a text message is by human filtering. However, in practice, this is a slow, error prone and expensive endeavor.

In automated systems typically used for emails, software filtering is used wherein each email passes through the filter as either unchanged, redirected elsewhere or marked as junk. In some cases, the filtering software may edit the email message during the processing to change or delete any objectionable content.

Today, these software filters use various criteria for sorting emails. In some instances, filtering decisions are based on regular expression matching. In other instances, filtering decisions are based on keywords found within the message. Additionally, some systems use historical training data from previous emails as a guide in the classification process. The keywords used in some systems can include a list of suitable and unsuitable keywords, wherein their presence in a message is used to determine whether the message is acceptable or unacceptable.

As will be appreciated by those having skill in the art, prior email filters are limited in their ability to effectively filter short text messages or other messages wherein various abbreviations and creative misspellings are used as substitutes to correctly spelled words or phrases. Additionally, in some of today's email systems, "junk email" is generated by organized groups and not individuals. This manifests as regularities and detectable patterns in the junk mail. However, today's email filtering techniques are not capable of handling user generated content that is produced by millions of independent users, which have less discernable regularities and patterns in them. As a result, email filters cannot effectively discern abbreviations and misspellings that are substitutes for content that should not pass through the filtering process.

Accordingly, the unique invention disclosed herein provides a solution for the above discussed problems in filtering short text messages and other text messages.

SUMMARY OF THE INVENTION

The present invention is directed to a system and method for filtering text messages to determine which of the messages, if any, contains undesirable or unsuitable content. In an embodiment in accordance with the present invention, a method is provided wherein a message is received comprising text having at least one character. The text is manipulated to generate a plurality of tokens that are compared to data contained in a plurality of databases. As a result, a plurality of probabilities is generated related to the suitability of the message. The probabilities are weighted to generate an overall probability related to the suitability of the message. The overall probability is then compared to a threshold value to rate the suitability of the message. Further, the rating associated with the message is displayed on a computer display screen or the like.

In another embodiment in accordance with the present invention, a method is provided wherein a text message having less than 161 characters is manipulated to generate a plurality of tokens. At least two probabilities related to the suitability of the message are generated wherein the probabilities are based, at least in part, on a comparison between the plurality of tokens and like data contained in at least one database. An overall probability related to the suitability o the message is then generated wherein the overall probability is based, at least in part, on a weighing of the at least two probabilities. Further, the message is displayed on a publicly viewable display if the overall probability is within a defined range.

In yet another embodiment in accordance with the present invention, a method is provided wherein text is manipulated within a text message having 160 characters or less to generate a plurality of tokens. The tokens are compared with data contained in at least one database to generate a plurality of probabilities related to the suitability of the message. Also, historical data based on a selected tokenization strategy is compared to generate a plurality of weights. The probabilities and the weights are used to generate an overall probability related to the suitability of the message. Also, the overall probability is compared to a threshold for rating the suitability of the message for public viewing.

In still another embodiment in accordance with the present invention, a method is provided wherein a tokenization strategy is selected from a plurality to tokens comprising words, n-grams, numbers and characters. The tokenization strategy is searched from the space of all possible tokenization strategies that work best in a given time window. Thus, the tokenization strategy is dynamic, and allows the system to adapt itself to changes in the nature of content. Accordingly, the text within the text message is manipulated to generate data for each of the selected tokens. The token data is compared to data contained in at least one database to generate a plurality of probabilities related to the suitability of the message. The probabilities are weighted to generate an overall probability related to the suitability of the message for public viewing. The overall probability is then compared to a threshold to rate the suitability of the message. Further, the rating associated with the message is displayed to a system user.

In a further embodiment in accordance with the present invention, a method is provided wherein a message is received comprising text having at least one character. The text is manipulated to generate a plurality of tokens. The tokens are compared to data contained in at least one database to generate a plurality of probabilities related to the suitability of the message. The probabilities are weighed to generate an overall probability related to the suitability of the message. The overall probability is then compared to a threshold to rate the suitability of the message for public viewing at an event. Further, the rating associated with the message is displayed to a system user.

In yet a further embodiment in accordance with the present invention, a method is provided wherein fine-grained training data is obtained from the user by highlighting fragments of messages and rating the suitability or unsuitability of those fragments, which are compiled in a database and used in a weighted average probability computation for the message. This also provides the system with information about special words, phrases and misspellings that are meaningful in the context of short messages service communication.

Other embodiments, systems, methods, features, and advantages of the present invention will be, or will become, apparent to one having ordinary skill in the art upon examination of the following drawings and detailed description. It is intended that all such additional systems, methods, features, and advantages included within this description be within the scope of the present invention, and be protected by the accompanying claims.

BRIEF DESCRIPTION OF THE DRAWINGS

The invention may be better understood with reference to the following drawings. The components in the drawings are not necessarily to scale, emphasis instead being placed upon illustrating the principles of the invention. In the drawings, like reference numerals designate corresponding parts throughout the several views.

DETAILED DESCRIPTION

Figure 1:
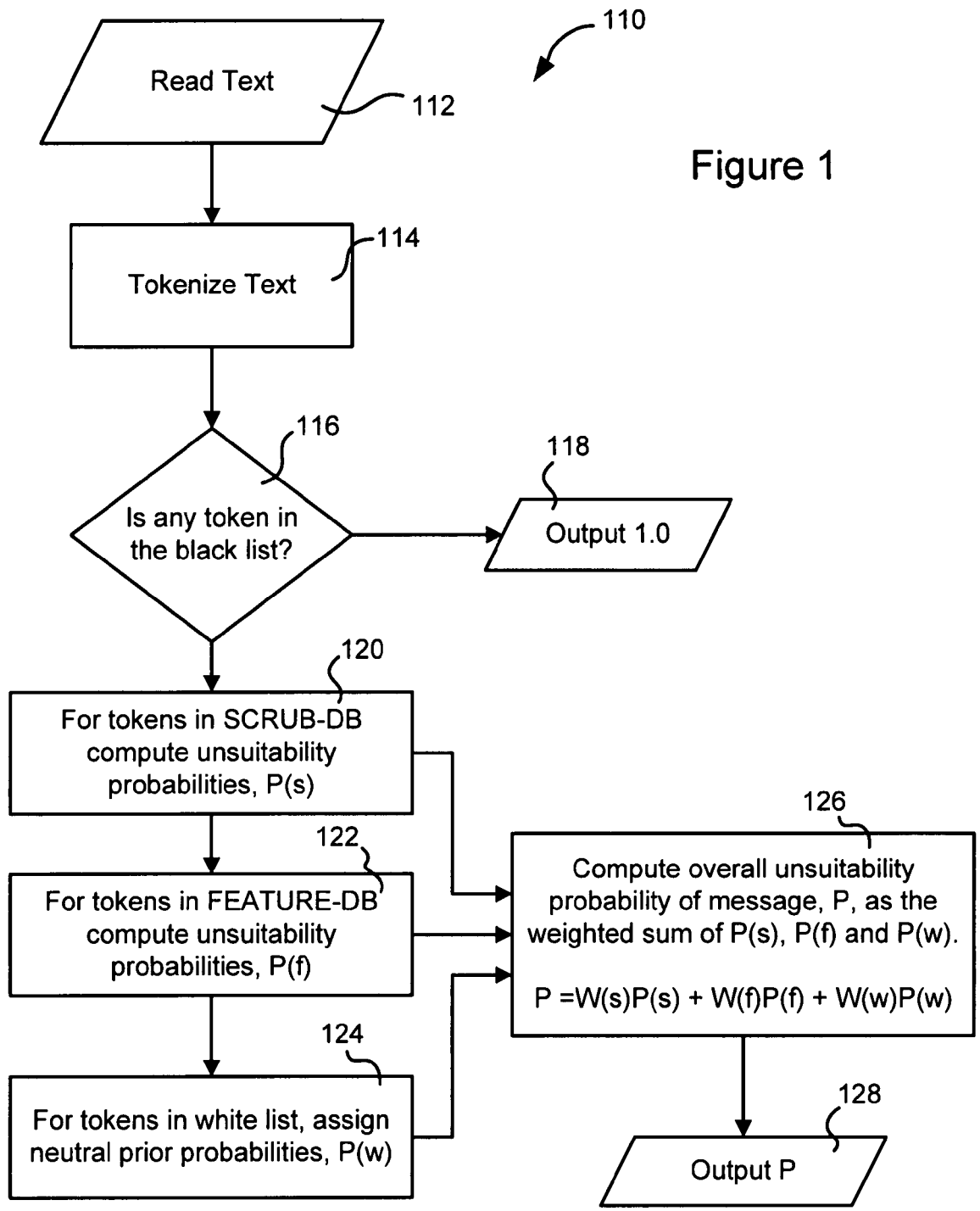
FIG. 1 is a simplified flow chart illustrating a method for filtering a short message service communication or text message in accordance with the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

In an embodiment, a learning and classification engine is provided for short message service communications. The engine can run in either a supervised or unsupervised learning mode. In the supervised mode the system learns from historical data that has already passed through a human monitor. Alternatively, in the unsupervised mode, the engine locates different types of messages via a clustering of the messages based on the constituent tokens. These techniques bear resemblance to the modern conventional email spam filters. However, since short text messages are limited to only 160 characters, and variations among the style, content and senders of such messages are greater than email. Accordingly, the invention implements a novel method and improvement on what is considered standard spam filter technology.

Also, in an embodiment, a system is provided for filtering of text messages received at, for example, a Text-2-Screen event such as described in U.S. patent application Ser. No. 11/113,604, incorporated herein by reference. Simply stated, Text-2-Screen generally consists of users sending text messages to a large public display screen at various venues wherein it is important to make sure that the content of the messages is suitable (i.e., that the messages do not contain any unacceptable content) before being publicly displayed.

Text-2-Screen events can include, but are not limited to, concert venues and event gatherings having a public viewing screen wherein, as stated previously, it is important to make sure that the messages displayed on the screen are acceptable to the public or audience attending the event. In an embodiment, a system is provided that allows a person or system user to review and approve or disapprove of every message before it is displayed on the public viewing screen. Preferably, the system provides for filtering or prescreening of the messages to assist the user in making the approval decisions. In particular, the system displays its judgment of the suitability of the message to the user. Moreover, the system can automatically block all messages considered to be offensive or inappropriate for the intended audience, thus reducing the efforts of the user in having to carefully review all messages in a timely manner.

Turning to FIG. 1, a simplified block diagram is provided for illustrating a method in accordance with the present invention. Preferably, but not necessarily, the output of the method 110 is in the form of a probability for indicating the suitability of a short text message input. In this embodiment, the probability output is a floating point number wherein 1.0 indicates that the message is unsuitable or inappropriate because the message includes, or is highly likely to include, at least one undesirable characteristic. Conversely, a probability output of 0.0 indicates that the message is suitable or appropriate because the message is not likely to contain any undesirable characteristics.

Stated another way, and as will be appreciated by those having ordinary skill in the art, because the output is a probability, the closer the output is to 1.0 then the more likely the message is unsuitable. Moreover, the closer the output is to 0.0 then the more likely the message is suitable. Accordingly, the output of the method may or may not achieve the extremes of 1.0 or 0.0, however it may get close to these extremes. Therefore, as stated further herein, thresholds can be used such that a probability output of 0.7 or greater is deemed unsuitable and a probability output of 0.0 or less is deemed suitable.

At step 112, the method 110 includes reading a short text message. As used herein, a short text message is a convention text message that is no longer than 160 alphanumeric characters and contains no images or graphics. Such messages are suitable for transmission to and from a mobile phone, fax machine, IP address or the like via a conventional short message service. The short text message can contain one or more words, phrases, special characters or numbers.

As will be appreciated by those having ordinary skill in the art, the present invention is not necessarily limited to short text messages. In particular, it is contemplated that the invention can also be used with email and other text message transmission mediums.

Moreover, the present invention can be used with messages in one or more languages. For instance, the invention can be used at events where the language used is expected to be exclusively English, exclusive Spanish, or a combination of both.

After the message is read at step 112, the text contained within the message is tokenized at step 114. As used herein, tokenization is the process of breaking down the message into primitive features or characters. The tokenization can be based on, for example, words, phrases, n-grams, numbers and special characters found within the short text message. The results of the tokenization can be stored in fields of a record associated with the message or other like means known to those having ordinary skill in the art.

Tokenization of words is desirably, but not necessarily, a process whereby the text message input is searched for sets of characters separated by blank or white spaces. Accordingly, under this process, a word does not necessarily have to be spelled correctly to be considered a word. Instead, any grouping of alphanumeric characters and special characters can be categorized as a word. As indicated previously, all of the words that are found in the message at step 114 can be stored in a word field of the record associated with the message.

Tokenization of phrases is desirably, but not necessarily, a process whereby the text message input is searched for: 1) sets of words; 2) the number of words; and, 4) whether the words are adjacent to each other. If words are found adjacent to each other, then a phrase field in the record associated with the message can indicate this fact, along with the number of words that are adjacent to each other.

Tokenization of n-grams is desirably, but not necessarily, a process whereby a sliding window of a defined size is slid over the message wherein blanks or spaces in the message are ignored. The characters provided in each window view can be stored in an n-grams field in the record associated with the message or retained by other like means.

Tokenization of numbers is desirably, but not necessarily, a process whereby all numbers found in the message can be stored in a numbers field in the record associated with the message. Likewise, tokenization of special characters is desirably, but not necessarily, a process whereby all special characters in the message can be stored in a special character field in the record associated with the message. As used herein a special character is a text character that is not a number or a letter of the alphabet.

In an embodiment, numbers and special characters can be removed from the message to create a modified message that is also tokenized in addition to the original message. For instance, the text in the modified message can be tokenized for words, phrases and n-grams. The removal of the number and special characters, and then tokenizing of the modified message provides tokens that are robust to attempts to obfuscate the original message with numbers and special characters.

After the message has been tokenized, the words in the word field associated with the message are searched at step 116 to determine if any of the words in the message are contained in a back list. The items in the black list can include several categories such as, for example, 1) swear words and the like; 2) various trademarks and brand names; 3) words obtained from previously screened messages; and, 4) racial words. The items or words contained in the black list can be both spelled correctly and can also be variants of undesirable words such as those that are obfuscated by special characters or purposefully broken up to make them hard to detect.

If in step 116 there is a match with one of the items in the black list, then a probability output 118 associated with the message is provided by the method 110 wherein the probability is set to 1.0 for indicating that the message is unsuitable. If a match is not found, then the method 110 proceeds to compare the tokens with information contained in other lists.

In FIG. 1, steps 120, 122 and 124 are for comparing the tokens generated in step 114 with information contained in various lists or databases. These steps are shown in FIG. 1 in a particular sequence. However, this is for illustrative purposes only. The invention should not be limited to the particular order of the steps shown in FIG. 1.

Figure 5:
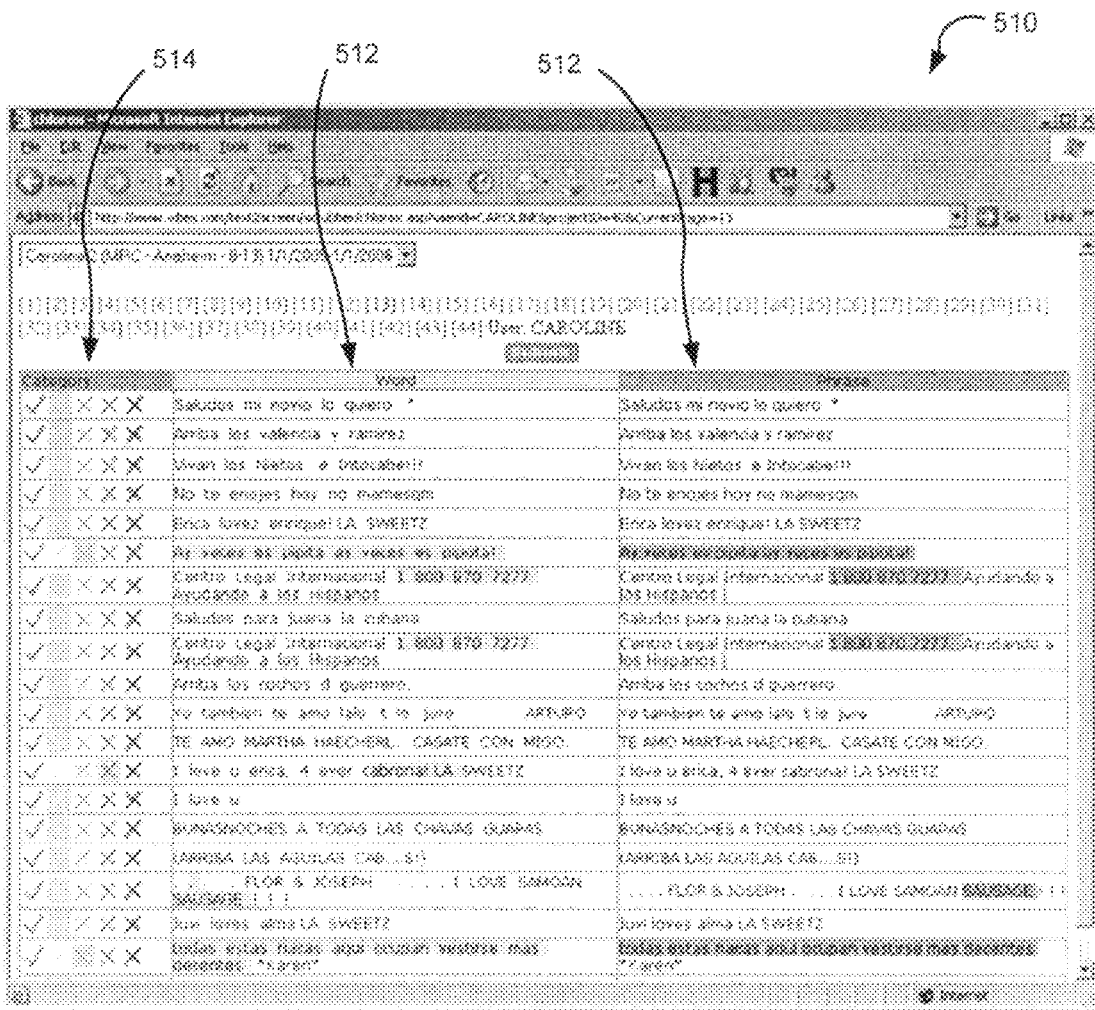

Turning to step 120, in this step the tokens associated with the message are searched to determine if any words in the message match any items contained in a scrub list or database. In an embodiment, the items contained in the scrub list are tokens from messages that have previously been screened and rated by an individual as shown in FIG. 5. In an embodiment, but not necessarily, the ratings in the scrub list are based on a five point scale that ranges from acceptable to unacceptable. Accordingly, in step 120, if the tokens associated with the message match those in the scrub list, then an appropriate probability is assigned to the message for this step.

At step 122, the tokens associated with the message are searched to determine if they match any of the items contained in a features list or database. In an embodiment, the items contained in the features list are suitability patterns of a plurality of tokens stored in a database. In particular, the features list contains the frequencies of the suitable and unsuitable occurrences of each token in the list.

For instance, the token word "love" can be an item stored in the database with a frequency count of 8,114 good or suitable occurrences and 796 bad or unsuitable occurrences. Likewise, the token word "show" can be stored in the database and have a frequency count of 85 good or suitable occurrences and 129 bad or unsuitable occurrences. Also, the token word "hate" can have a frequency count of 2 good or suitable occurrences and 200 bad or unsuitable occurrences.

Preferably, at step 122, a modified version of a Bayes algorithm is used to make overall suitability judgments on the content of the message based on matches with any items contained in the features list. The basic probability of a feature being unsuitable can be calculated by the following ratio: p=(bad or unsuitable occurrences)/(bad or unsuitable occurrences+good or suitable occurrences).

However, as will be appreciated by those having ordinary sill in the art, if a feature has been seen multiple time verses being seen only a few times, then the probability should be weighted accordingly. To this end, Robinson's formula can be used to provide a correction for weighing based on total frequency. In particular, $$P^* = (\text{Weight} * \text{Prior} + \text{Number of Data Points} * p) / (\text{Weight} + \text{Number of Data Points}),$$

wherein
p=basic probability,
Weight=1, and
Prior=0.5 for never seen tokens, 0.2 for tokens from the white list and 0.99 for tokens from the blacklist.

The above formula provides a probability regarding the unsuitability of each of the features. Accordingly, the probability of the unsuitability of the text message is computed by combining the individual feature probabilities. Preferably, this is done by using a technique developed by Sir Ronald Fisher in 1950. In particular, Fisher coefficient, $F = -2 * \text{Log}(\hat{P}^*)$ Hypothesis Testing:

Given the token probabilities, $P^*$, and the Fisher coefficient, F, and I, the inverse chi-square probability, Accept or Reject:

H0=Message is a random collection of tokens

Robinson's method $$\text{Unsuitability} = 0.5 * (F + (1 - I))$$

Like the output at step 120, the output of step 122 is generated as a probability used in determining the overall suitability of the message for a viewing audience. Accordingly, as described further herein, the output of step 122 is used in step 126.

Turning to step 124, the tokens associated with the message are searched to determine if any words in the message match any items contained in a white list or database. The items in the white list can be basic words such as the common words used to define the meaning of other more complex words in a dictionary. For instance, the items in the white list can be from a dictionary such as, for example, Longmans Dictionary Basic Words. Thus, in step 124, if the tokens associated with the message match those in the white list, then a neutral probability is assigned to the tokens.

As indicated above, the probability outputs P(s), P(f) and P(w) of steps 120, 122 and 124, respectively, are used to compute an overall suitability probability of the message. In particular, the probability outputs P(s), P(f) and P(w) are received by step 126 and are used therein to calculate a weighted probability output 128. In step 126, each probability output P(s), P(f) and P(w) of steps 120, 122 and 124 are multiplied by a respective weighting factor W(s), W(f) and W(w). Preferably, the maximum output 128 of step 126 is 1.0, indicating that the message contains undesirable content, and the minimum output is 0.0, indicating that the message does not contain any undesirable content.

Preferably, but not necessarily, the weighting factors are such that W(s) is greater than W(f) which is greater than W(w). Accordingly, a higher value is given to data coming from step 120 than from step 122, and a higher value is given to data coming from step 122 and from step 124.

Figure 2:
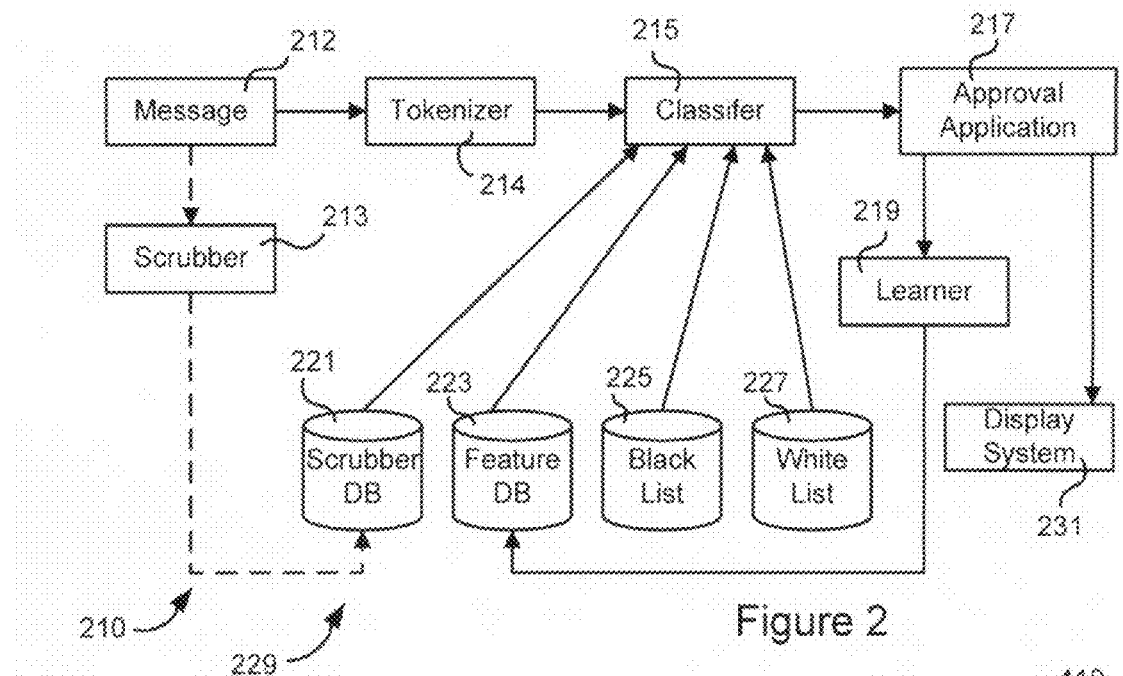
FIG. 2 is a simplified block diagram of a system for implementing the method of FIG. 1 in accordance with the present invention.

Turning to FIG. 2, a simplified block diagram is provided of a system for implementing the decision process of FIG. 1. Accordingly, the system 210 classifies incoming messages as "good" or "bad." The classification judgment can then be passed to an approval application 217 wherein a human such as a system user can decide whether to block or publicly display the message. As explained herein, the system 210 can be run fully automatically or in a human augmented mode. In the human augmented mode the ratings from the system 210 are meant as a suggestion to facilitate the human (i.e., user or operator) in the task of reviewing the messages, wherein the user can primarily focus on the unclassified messages (i.e., the messages that the system does not classify as either suitable or unsuitable) and/or the messages that are deemed suitable by the system, since they might be broadcast in a public manner. In an embodiment, the system can automatically make the suitability decisions based on comparing the classification to a threshold level regarding acceptable messages.

As depicted in FIG. 2, the system 210 includes, among other items, a tokenizer 214, a classifier 215, an approval application 217, and a plurality of databases 229. At block 212 a short message, as previously described and defined above, is received by the system 210. The message is converted or dissected into a plurality of originated features or components by the tokenizer 214 as previously described above with regard to step 114 of FIG. 1.

Next, as also previously described above, at least one of the originated features is compared by the classifier 215 to a plurality of stored features that are stored in at least one of the databases 229 and thus used for computing or determining an overall probability of the suitability of the message received. The stored features within the databases 229 can include a black list 225 having a plurality of predetermined undesirable features as previously described with regard to step 116 of FIG. 1, a white list 227 having a plurality of approved features as previously described with regard to step 124 of FIG. 1, and a feature list 223 having a plurality of pre-valued features as previously described with regard to step 122 of FIG. 1.

Accordingly, the feature list or database 23 can include statistics for a plurality of features wherein the statistics are generated from a plurality of historical messages such as messages obtained from past events. In addition, as described in detail further herein, the feature database 223 can be updated in real time via the approval application 217 and learner 219.

Also as part of the plurality of databases 229, a scrubber database 221 can be included as previously described above with regard to step 120 of FIG. 1. Accordingly, the database 221 can contain data from a plurality of hand-filtered messages wherein annotations are provided regarding the suitability or unsuitability of various aspects found within the messages.

The overall probability determination provided by the classifier 215 is transferred to the approval application 217 wherein, in an embodiment, the probability rating of the message is used to determine if the message should be forwarded to a public display system 231.

Figure 4:
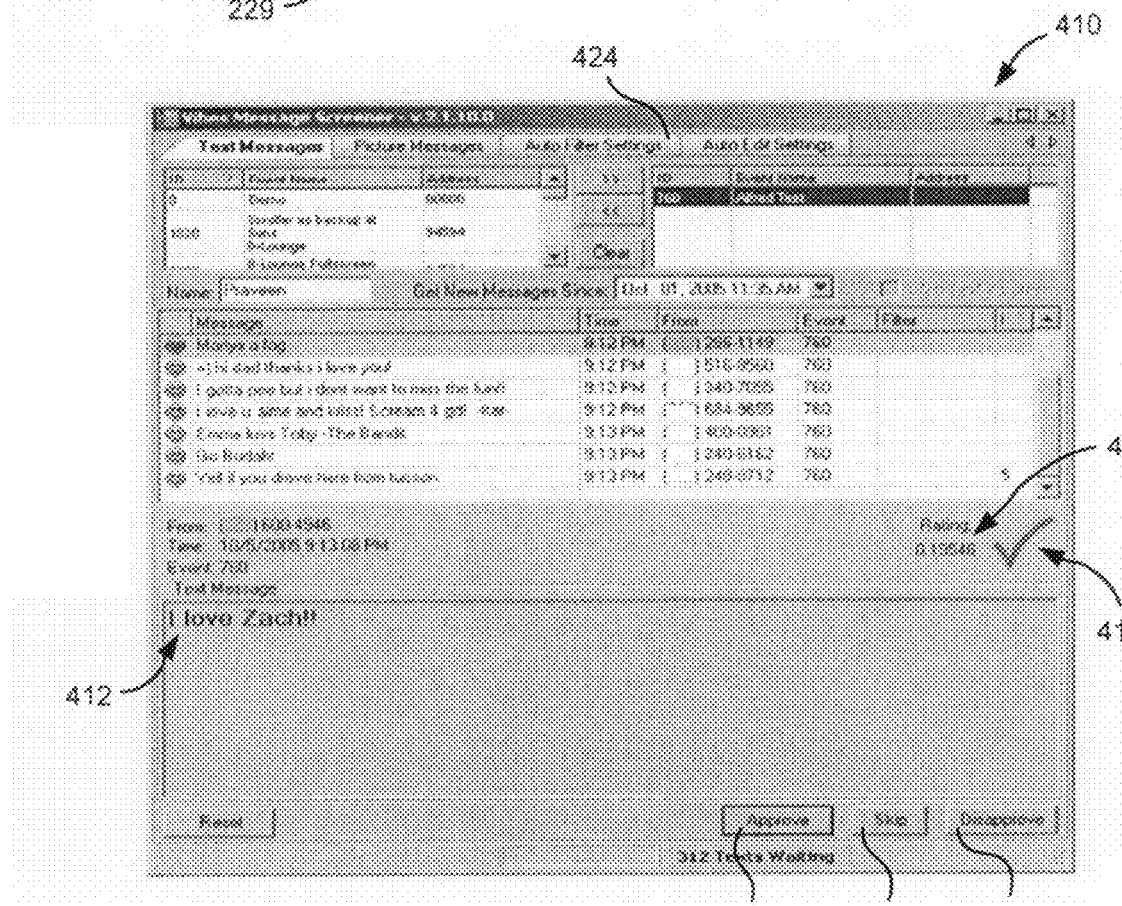
FIG. 4 is a graphical user interface screen of the approval interface depicted in FIG. 2 which is a user interface for examining the system results and, if desired, allowing a; user to approve the results; and, FIG. 5 is a graphical user interface screen of the scrubber interface depicted in FIG. 2 which allows for eliciting fine-grained data about the suitability and unsuitability of messages and the constituent fragments of the messages.

Turning to FIG. 4, the approval application 217 of FIG. 2 can display, in an approval window or dialog box 410, each message (e.g., reference numeral 412 of FIG. 4) along with its approval probability (e.g., reference numeral 414 of FIG. 4) determined by the classifier 215. A visual indication 416 can also be provided to clearly indicate if the message is suitable or unsuitable. For instance, the visual indication can be a green checkmark for a suitable message, a red X for an unsuitable message, and no visual indication for a message that cannot be determined by the classifier 215 to be either suitable or unsuitable.

In an embodiment, via the approval window or dialog box 410, a system user can enable messages to be automatically forwarded for public display based on the judgment of the classifier or have the application 217 wait for a decision from the user. In the window 410, control of the decisions regarding what messages are suitable for automatic forwarding to a public display system 231 can be made via an auto filter tab 424 wherein a system user can set the probability level that must be found by the classifier if the message is to be forwarded to the display system 231.

Accordingly, as a result of the suitability of the message being expressed as a probability, thresholds can be established for clarifying which messages are suitable and which messages are unsuitable. For instance, in an embodiment, messages having a probability rating of 0.3 or less are deemed suitable, messages having a probability rating of 0.6 or greater are deemed unsuitable, and messages between 0.3 and 0.6 are deemed unsure.

Preferably, the thresholds can be changed by a user via the approval application 217 to satisfy the system user's requirements based on how strict or liberal the system user wants the filtering to be. For instance, a lower threshold can imply a stricter filter at events whose demographic might be below 21 years of age.

If messages are to be reviewed by a system user before being forwarded to the display system 231, then decisions made by the user can be entered in a conventional manner via a plurality of buttons that include, for instance, an approve button 418, a skip button 420 and a disapprove button 422 in the window 410 of FIG. 4. Only messages that are approved are sent to the public display system 231.

However, in an embodiment, both messages that are approved and disapproved by a system user are received by the learner application 219 wherein the results of the user's decision and the features of the message are entered by the application into the feature database 223.

Figure 3:
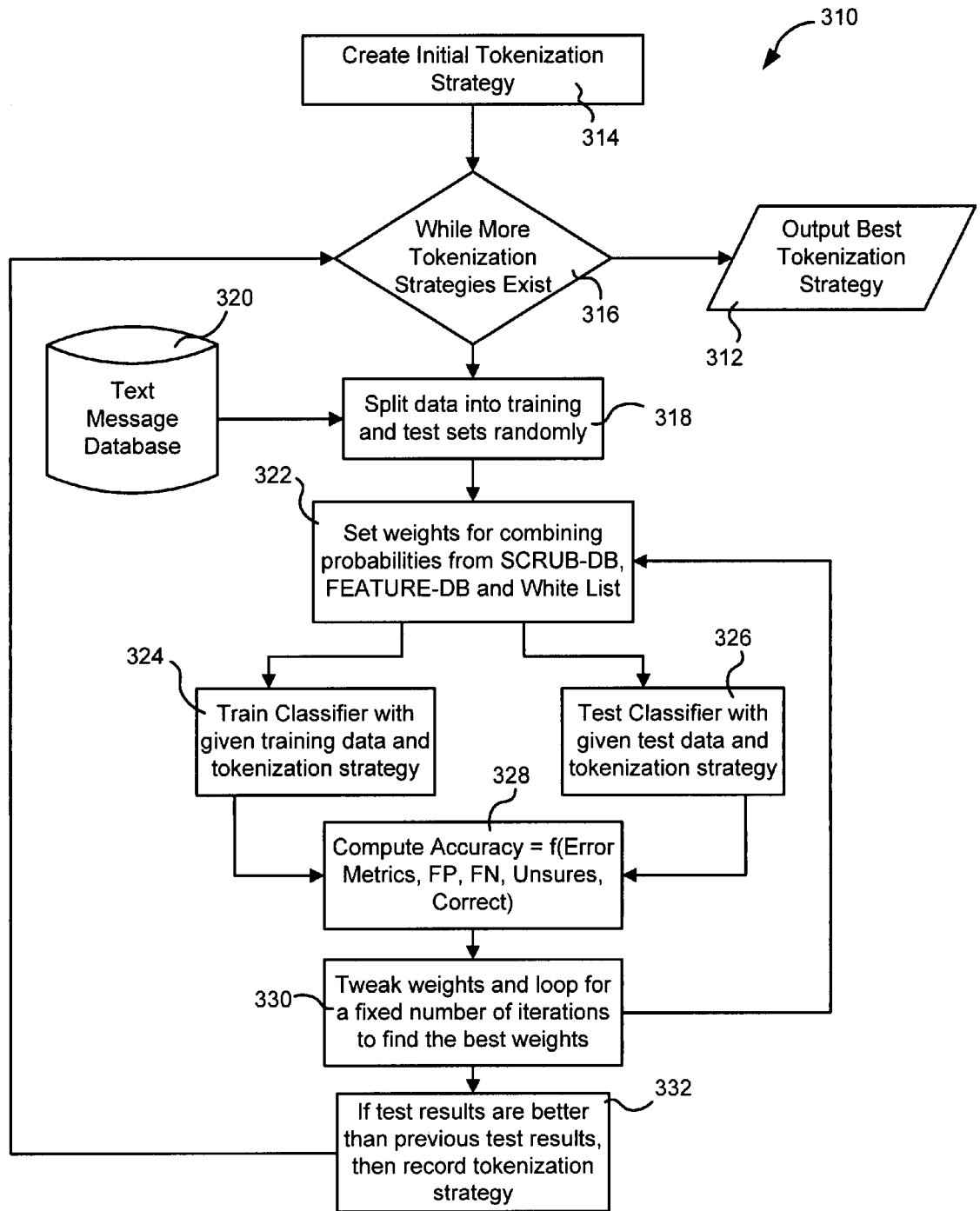
FIG. 3 is a simplified flow chart illustrating a method for calibrating the method of FIG. 1 in accordance with the present invention by implementing a dynamic tokenization mechanism.

Turning to FIG. 3, a process is shown for optimizing a tokenization strategy used in the method of FIG. 1. Preferably, but not necessarily, the output 312 of the method 310 are weightings W(s), W(f) and W(w) for use in step 126 of the decision process of FIG. 1 along with a determination of which tokens should be used in the method.

At step 314, initial token selection settings are provided for beginning the method 310 of FIG. 3. As indicated previously above, the tokens available can be words, phrases, n-grams, numbers and special characters.

As such, at step 314, flags are set for each of the tokens initially selected. For instance, if words are to be used in the initial tokenization strategy, then a word token flag is set to "true." Otherwise, the word token is set to "false."

Similarly, if phrases are to be used in the initial tokenization strategy, then a phrases token flag is set to "true" in step 314. Further, a flag can be set if words adjacent to each other are to be considered along with a variable (e.g., a whole number) indicating how many words shall be in the considered phrases.

Also, if n-grams are to be used in the initial tokenization strategy, then an n-grams token flag is set to "true" in step 312. Also, a variable (e.g., a whole number) can be set for indicating how many words are to be contained in the window slid over the text.

Moreover, if numbers and special characters are to be used in the initial tokenization strategy, then a numbers token flag and a special characters token flag can be set, respectfully. Otherwise, the flags are set to "false."

At step 316, the preliminary output of the method 310 is analyzed to determine if more tokenization strategies are available for consideration in the optimization process. Preferably, this process continues until the best results are obtained regarding the selection of tokens and weightings for implementation within the method of FIG. 1.

At step 318, data from a text message database 320 is separated into training and test sets. In particular, the data within database 320 includes a plurality of text message records comprising, for instance, data from previous messages sent from individuals at various Text-2-Screen events. Thus, the data within the database provides a more realistic test and training environment.

At step 322, weights W(s), W(f) and W(w) are initially assigned for combining the probabilities from a plurality of comparisons with the scrub database, feature database and white list previously described above. Preferably, but not necessarily, the weighting factors are assigned such that W(s) is greater than W(f) which is greater than W(w).

At step 324, the classifier 215 (FIG. 2) is trained using the training data and current tokenization strategy that is to be evaluated. Accordingly, the training data is used in the methodology of FIG. 1 wherein, via the approval application, the training data is evaluated and the results are entered into the feature database or list 223 (FIG. 2).

In an alternative embodiment, the training can be conducted automatically wherein the text messages within the database 320 have been previously scored or rated by an individual or user. Accordingly, the data within the feature database can be automatically populated with the previously scores or ratings associated with the message in the database 320.

At step 326, the classifier 215 (FIG. 2) is tested using the test data, the current tokenization strategy, and the data entered into the feature database or list 223 as derived by the evaluation of the training data in step 324.

At step 328, the accuracy of the test results is computed. In particular, the results of the text messages that were determined by the method of FIG. 1 to be suitable, unsuitable, and unsure as to suitability are compared with the desired or correct results. As a result, an overall accuracy percentage is provided with regard to the currently selected tokenization strategy and weighting factors (i.e., W(s), W(f) and W(w)).

At step 330, the weighting factors used in the method of FIG. 1 can be altered and the computation of the error rate between the training data and the test data can be reiterated. This process can be executed for a number of times for determining the appropriate weighting factors for use with the current tokenization strategy. In particular, the preferred weighting factors are those resulting in the smallest accuracy error rate in step 328.

At step 332, the accuracy of the current test results are compared with the accuracy of the previous test results, if any, and if the current results are better than the previous results, the current results are stored and the system returns to step 316.

At step 316, after all tokenization strategies have been evaluated, the 312 output of the method is provided comprising an optimized tokenization strategy and optimized weighting factors associated with the test data for use in the method of FIG. 1.

In executing the methodology of FIG. 1, a call or routine can be provided for explaining how a decision was achieved in evaluating the suitability of a message. In particular, for a selected message, the call many provide all probabilities associated for each token and database comparison for display on a display screen. Thus, any changes to the tokens or the data within the databases can be made by a system user so the system provides the desired results.

Also, as previous stated above with regard to FIG. 2, the system 210 can include a scrubber database or list 221 that contains data from a plurality of hand-filtered messages. As stated previously, these messages can include annotations regarding the suitability or unsuitability of various aspects found within the messages. The annotations can be made via a scrubber application 213 wherein the messages received at step 212 are historical messages obtained from previous public events or the like.

In an embodiment, the scrubber application 213 of FIG. 2 can display a scrubber window or dialog box 510 depicted in FIG. 5. In the window 510, the messages are displayed along with token categories 512 that are of interest and thus chosen or selected by a system user.

In the token categories 512, a system user can select by convention means, such as by highlighting, portions or fragments of the displayed messages along with providing a rating, via a rating category 514, regarding the suitability of the highlighted portion of the message. As indicated previously, the rating can be based on a five point scale ranging from acceptable to unacceptable.

After a user has reviewed the message data, the results can be stored in the scrubber database or list 221 of FIG. 2. Preferably, but not necessarily, the scrubber application 213 is only executed as a post processing tool.

As also indicated previously with regard to FIG. 1, at step 112 a message is read. Preferably, but not necessarily, the message is transmitted by a portable communication device such as a cellular telephone. However, it will be understood that any portable communication device capable of creating a first communication in text format is capable of interaction with the system in accordance with the principles of the present invention. For example, the portable communication device may be a personal digital assistant such as that available through cellular service carriers, or two-way text messaging devices. Furthermore, although the preferred communication device is portable, mobile, and configured for interaction and communication with a cellular communication network, it will be understood that other suitable non-mobile devices may be used in connection with the present invention.

Generally, for the messages to be received, one or more carrier interfaces are provided to each of a plurality of the short message service centers (SMSC). Further, for carrying out the steps of FIG. 1 a plurality of servers, user databases, and logic embedded in a computer may be used. Alternatively, the steps can be executed on a carrier network.

According to the present invention, a carrier connection interface (not shown) is configured to receive a mobile originated (MO) communication from at least one short message service center (SMSC). It will be understood that the short message service communications are received by, for example a server (e.g. computer), over a communication network either directly or in combination with the internet or other network. Such networks are known and well established.

In an embodiment, the server is configured to receive a mobile originated communication from the carrier connection interface as depicted in step 112 of FIG. 1. The server can further be configured to convert the original short message service communication into originated features as depicted in step 114. Also, the remaining steps of the method can be completed by the server. However, in an alternative embodiment, instead of a server, the steps can be executed by a portable computing device such as a portable computer, personal digital assistant or handheld mobile device connected to the carrier connection interface.

Accordingly, with references to the FIGURES, the process descriptions or blocks show therein should be understood as representing hardware, hardware and/or software modules, code segments, or portions of code which include one or more executable instructions for implementing specific logical functions or steps in the process. Alternate implementations are included within the scope of the embodiments of the present invention in which functions may be executed out of order from that shown or discussed, including substantially concurrently or in reverse order, depending on the functionality involved, as would be understood by those having ordinary skill in the art.

It will further be understood to one of ordinary skill in the art that "logic" as used herein may be embodied in computer readable storage medium adapted to control a computer or other electrical hardware or circuitry. Alternatively, logic may be hard-wired circuitry in a computer or electrical hardware which enables the performance of logic functions or operations as described herein. It should also be understood that reference to a code segment or logic can mean the same code segment or logic used to perform another operation or function as a prior or subsequently described code segment or logic.

It should also be emphasized that the above-described embodiments of the present invention, and particularly any "preferred" embodiments, are possible examples of implementations merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the present invention, and protected by the following claims.

What is claimed is:

1. A method comprising the steps of:
receiving a text message comprising content entered by a user, the content having abbreviations or misspellings within a sentence or sentence fragment, the abbreviations or misspellings comprising text having at least one character;
generating a plurality of tokens through manipulation of the text, wherein each of the plurality of tokens is related to the content of the message;
comparing the plurality of tokens with data contained in at least one database to generate a plurality of probabilities related to the suitability of publicly displaying the message, the data comprising at least one trademark and statistics derived, at least in part, from historical message data comprising text abbreviations or misspellings;
weighing the probabilities to generate an overall probability related to the suitability of publicly displaying the message;
comparing the overall probability to a threshold value to derive a rating of the suitability of publicly displaying the message; and
displaying the rating associated with the message.

2. The method of claim 1 further comprising the step of rating the suitability of a fragment of another message to generate at least a portion of the data contained in the at least one database.

3. The method of claim 1 further comprising the step of rating the suitability of another message to generate at least a portion of the data contained in the at least one database.

4. The method of claim 1 further comprising the step of comparing said historical data based on a selected tokenization strategy to generate a plurality of weights used in the step of weighing the probabilities.

5. The method of claim 4 further comprising the step of automatically updating the weights.

6. The method of claim 1 further comprising the step of selecting unacceptable text within another message to generate at least a portion of the data contained in the at least one database.

7. The method of claim 1 further comprising the step of executing the method on a personal handheld mobile device.

8. The method of claim 1 further comprising the step of executing the method on a carrier network.

9. The method of claim 1 wherein the message is received from a short message service.

10. The method of claim 1 wherein the plurality of tokens comprise at least one from a group comprising: words, phrases, n-grams, numbers and characters.

11. The method of claim 1 further comprising the step of displaying the message if the overall probability is within a defined range.

12. A method comprising the steps of:
manipulating a text message comprising content entered by a user, the content having abbreviations or misspellings within a sentence or sentence fragment, the text message having less than 161 characters;
generating a plurality of tokens, each of the plurality of tokens being related to the content of the message;
generating at least two probabilities related to the suitability of publicly displaying the message based, at least in part, on a comparison between the plurality of tokens and data contained in at least one database, the data comprising at least one trademark and statistics derived, at least in part, from historical message data comprising text abbreviations and misspellings;

generating an overall probability related to the suitability of publicly displaying the message based, at least in part, on a weighing of the at least two probabilities; and displaying the message if the overall probability is within a defined range.

13. The method of claim 12 further comprising the step of rating the suitability of a fragment of another message to generate at least a portion of the data contained in the at least one database.

14. The method of claim 12 further comprising the step of rating the suitability of another message to generate at least a portion of the data contained in the at least one database.

15. The method of claim 12 further comprising the step of comparing said historical data based on a selected tokenization strategy to generate a plurality of weights for weighing the at least two probabilities.

16. The method of claim 15 further comprising the step of automatically updating the weights.

17. The method of claim 12 further comprising the step of selecting unacceptable text within another message to generate at least a portion of the data contained in the at least one database.

18. The method of claim 12 further comprising the step of executing the method on a personal handheld mobile device.

19. The method of claim 12 further comprising the step of executing the method on a carrier network.

20. The method of claim 12 further comprising the step of receiving the message from a short message service.

21. The method of claim 12 wherein the plurality of tokens comprise at least one from a group comprising: words, phrases, n-grams, numbers and characters.

22. The method of claim 12 further comprising the step of displaying the overall probability related to the suitability of the message.

23. A method comprising the steps of:
manipulating text within a text message comprising content entered by a user, the content having abbreviations or misspellings within a sentence or sentence fragment, the text message having 160 characters or less;
generating a plurality of tokens, each of the plurality of tokens being related to the content of the message;
comparing the plurality of tokens with data contained in at least one database to generate a plurality of probabilities related to the suitability of publicly displaying the message, the data comprising at least one trademark and statistics derived, at least in part, from historical message data comprising text abbreviations or misspellings;
comparing historical data based on a selected tokenization strategy to generate a plurality of weights;
generating with the plurality of probabilities and the plurality of weights an overall probability related to the suitability of publicly displaying the message; and
comparing the overall probability to a threshold to rate the suitability of publicly displaying the message.

24. The method of claim 23 further comprising the step of rating the suitability of a fragment of another message to generate at least a portion of the data contained in the at least one database.

25. The method of claim 23 further comprising the step of rating the suitability of another message to generate at least a portion of the data contained in the at least one database.

26. The method of claim 23 further comprising the step of automatically updating the weights.

27. The method of claim 23 further comprising the step of selecting unacceptable text within another message to generate at least a portion of the data contained in the at least one database.

28. The method of claim 23 further comprising the step of executing the method on a personal handheld mobile device.

29. The method of claim 23 further comprising the step of executing the method on a carrier network.

30. The method of claim 23 further comprising the step of receiving the message from a short message service.

31. The method of claim 23 wherein the plurality of tokens comprise at least one from a group comprising: words, phrases, n-grams, numbers and characters.

32. The method of claim 23 further comprising the step of displaying the message if the message is found suitable.

33. A method comprising the steps of:
selecting a tokenization strategy from a plurality of generated tokens comprising words, phrases, n-grams, numbers and characters;
manipulating text within a text message comprising content entered by a user, the content having abbreviations or misspellings within a sentence or sentence fragment, to generate data for each of the plurality of tokens selected wherein the data is related to the content of the message;
comparing the token data with data contained in at least one database to generate a plurality of probabilities related to the suitability of publicly displaying the message, the data comprising at least one trademark and statistics derived, at least in part, from historical message data comprising text abbreviations or misspellings;
weighing the probabilities to generate an overall probability related to the suitability of publicly displaying the message;
comparing the overall probability to a threshold to rate the suitability of publicly displaying the message; and
displaying the rating associated with the message.

34. The method of claim 33 further comprising the step of rating the suitability of a fragment of another message to generate at least a portion of the data contained in the at least one database.

35. The method of claim 33 further comprising the step of rating the suitability of another message to generate at least a portion of the data contained in the at least one database.

36. The method of claim 33 further comprising the step of comparing said historical data based on a selected tokenization strategy to generate a plurality of weights for the step of weighing the probabilities.

37. The method of claim 36 further comprising the step of automatically updating the weights.

38. The method of claim 33 further comprising the step of selecting unacceptable text within another message to generate at least a portion of the data contained in the at least one database.

39. The method of claim 33 further comprising the step of executing the method on a personal handheld mobile device.

40. The method of claim 33 further comprising the step of executing the method on a carrier network.

41. The method of claim 33 further comprising the step of receiving the text message from a short message service.

42. The method of claim 33 wherein the plurality of tokens comprise at least one from a group comprising: words, phrases, n-grams, numbers and characters.

43. The method of claim 33 further comprising the step of displaying the message if the rating is within a defined range.

44. A method comprising the steps of:
receiving a text message comprising content entered by a user, the content having abbreviations or misspellings within a sentence or sentence fragment, the abbreviations or misspellings comprising text having at least one character;

generating a plurality of tokens, each of the plurality of tokens being related to the content of the message;

comparing the plurality of tokens with data contained in at least one database to generate a plurality of probabilities related to the suitability of publicly displaying the message, the data comprising at least one trademark and statistics derived, at least in part, from historical message data comprising text abbreviations or misspellings;

weighing the probabilities to generate an overall probability related to the suitability of publicly displaying the message;

comparing the overall probability to a threshold to rate the suitability of the message; and displaying the rating associated with the message.

45. The method of claim 44 further comprising the step of rating the suitability of a fragment of another message to generate at least a portion of the data contained in the at least one database.

46. The method of claim 44 further comprising the step of rating the suitability of another message to generate at least a portion of the data contained in the at least one database.

47. The method of claim 44 further comprising the step of comparing said historical data based on a selected tokenization strategy to generate a plurality of weights for the step of weighing the probabilities.

48. The method of claim 47 further comprising the step of automatically updating the weights.

49. The method of claim 44 further comprising the step of selecting unacceptable text within another message to generate at least a portion of the data contained in the at least one database.

50. The method of claim 44 further comprising the step of executing the method on a personal handheld mobile device.

51. The method of claim 44 further comprising the step of executing the method on a carrier network.

52. The method of claim 44 wherein the message is received from a short message service.

53. The method of claim 44 wherein the plurality of tokens comprise at least one from a group comprising: words, phrases, n-grams, numbers and characters.

54. The method of claim 44 further comprising the step of displaying the message if the rating is within a defined range.

* * * * *